United States Patent [19]

Sugiyama et al.

[11] 4,446,470
[45] May 1, 1984

[54] INK-JET COLOR PRINTING SYSTEM

[75] Inventors: Masatoshi Sugiyama; Kazutaka Yoshida; Akira Ogawa, all of Kanagawa, Japan

[73] Assignee: Fuji Photo Film Co., Ltd., Kanagawa, Japan

[21] Appl. No.: 384,086

[22] Filed: Jun. 1, 1982

[30] Foreign Application Priority Data

May 30, 1981 [JP] Japan .................................. 56-82989

[51] Int. Cl.³ .......................................... G01D 15/16
[52] U.S. Cl. .................. 346/140 R; 106/22; 358/75
[58] Field of Search ...................... 346/1.1, 75, 140 R; 358/75; 106/22

[56] References Cited

U.S. PATENT DOCUMENTS

| | | |
|---|---|---|
| 3,553,371 | 1/1971 | Suenaga . |
| 3,977,007 | 8/1976 | Berry et al. . |
| 4,410,909 | 11/1983 | Ueda et al. ............................ 385/75 |
| 4,412,225 | 8/1983 | Yoshida et al. ....................... 346/75 |

FOREIGN PATENT DOCUMENTS 54-12641 6/1979 Japan .

OTHER PUBLICATIONS

"A 3-Color Ink Jet Plotter for Computer Graphics", Bit 13, (1973), pp. 181-195.
Siemens Review Magazine, 1975, pp. 235-241.

Primary Examiner—E. A. Golberg
Assistant Examiner—T. DeBoer
Attorney, Agent, or Firm—Young & Thompson

[57] ABSTRACT

An ink-jet color printing system for painting a color image with complex colors arranged in ink-dot patterns; comprises a color image information input unit for reading out color image information from a color original, a color image information processing unit for memorizing the color image and carrying out a non-linear masking procedure, and color printer apparatus for painting a color image by depositing ink dots of yellow, magenta and cyan on a recording medium. New yellow, magenta and cyan ink dyes are also disclosed.

10 Claims, 4 Drawing Figures

INK-JET COLOR PRINTING SYSTEM

BACKGROUND OF THE INVENTION

The present invention relates to an ink-jet color printing system for forming color images of complex color. More particularly, the invention pertains to the ink-jet color printing system in which a color image faithful to the original color reproduction can be produced by using a non-linear masking technique and by using cyan, magenta and yellow inks in combination in the ink-jet color printing apparatus.

In the conventional ink-jet color printing apparatus for painting color images having complex color such as a color photograph, a color image is painted by means of a dot pattern wherein the injection of colored inks is regulated by driving the ink-jet heads for yellow, magenta and cyan which receive density signals of blue, green and red, respectively. However, in the heretofore known ink-jet color printing apparatus, it is difficult to paint a color image which is faithful to the original color in the original picture having complex color.

It has become clear from investigation of deteriorated images that either insufficient color corrections in the masking procedure or inappropriate combinations of yellow, cyan and magenta inks will cause a deterioration in color reproducibility.

That is to say, a conventional masking procedure by the use of a linear equation having variables which are the color density of three primary colors, namely, blue, green and red, is not desirable for obtaining a fine color correction on account of the fact that there is an extremely high degree of non-linearity between the amount of ink and the optical density.

Inks usually used in ink-jet color printing apparatus contain water-soluble dyes such as direct dyes or acid dyes as described in Japanese Patent Examined Publication Nos. 54-16243, 54-16244, 54-16245 and 54-21765 and Japanese Patent Unexamined Publication Nos. 49-89534, 52-96105, 52-146307, 53-77706 and 54-89811. Between the mixing ratio in which the inks containing water-soluble dyes aforementioned are mixed, and the hue of a color obtained by the mixing, there is a non-linearity in a subtractive mixture, and there is a tendency for the mixed color to appear as coloration unable to be absorbed, even though a polynominal function including non-linear terms is applied to a masking procedure. Therefore, in order to make improvements in color reproducibility, it is necessary to employ inks more suitable in coloration and to carry out a masking procedure having due consideration for the characteristics of the inks.

OBJECTS OF THE INVENTION

The principal object of the present invention is to provide an ink-jet color printing system which can reproduce a color image with hues closely similar to those of the color original.

Another object of the present invention is to provide an ink-jet color printing system comprising means for performing color correction by using a non-linear masking technique.

A further object of the present invention is to provide an ink-jet color printing system comprising means for improving the coloration by suitable combination of yellow, magenta and cyan inks.

Finally, it is an object of the present invention to provide improved yellow, magenta and cyan ink dyes.

SUMMARY OF THE INVENTION

These and other objects of the present invention are attained in conjunction with the present invention by applying a non-linear masking procedure for color image information, regulating the amounts of colored inks which are ejected from the ink-jet head assembled, in corresponding to yellow, cyan and magenta depending upon color corrected color-image information, and supplying improved yellow, magenta and cyan inks to each ink-jet head in the ink-jet color printing apparatus using a digital data processing technique.

BRIEF DESCRIPTION OF THE DRAWINGS

Other objects, advantages and features of novelty of the present invention will be evident to those skilled in the art from a reading of the following specification in conjunction with the accompanying drawings. Those drawings show, for illustrative purposes only, preferred embodiments of the invention.

In the drawings.

DETAILED DESCRIPTION OF THE INVENTION

Figure 1:
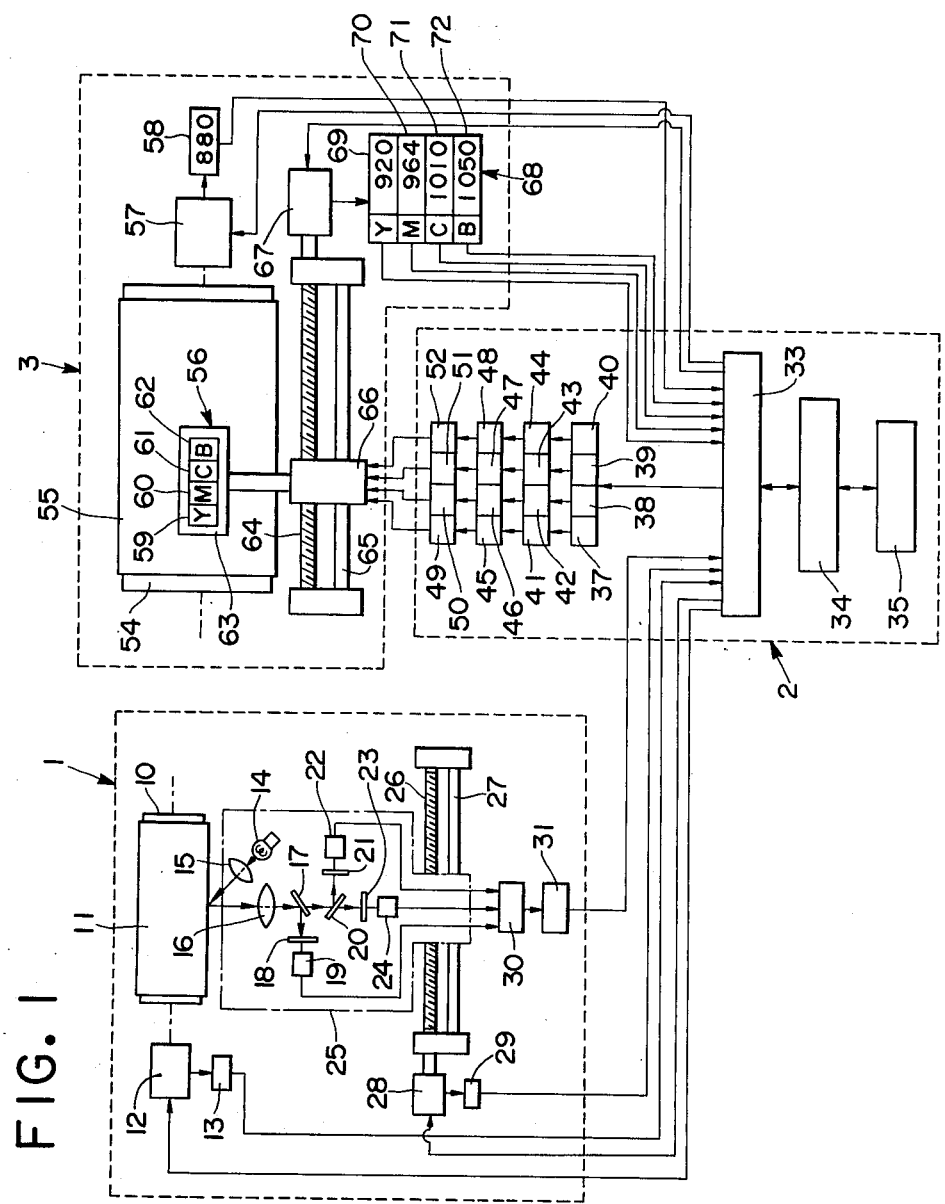
FIG. 1 is a schematic illustration of ink-jet color printing apparatus comprising a preferred embodiment of the present invention.

Referring now in detail to the drawings, wherein like reference numerals denote the same or similar elements throughout the several views, in a preferred embodiment illustrated in FIG. 1, there is schematically shown an ink-jet color printing apparatus comprising a color image information input unit 1 which reads the color information of color picture images of an original by a two-dimensional scanning of the color images and then converts them into digital signals, a color image processing uint 2 for memorizing the color image information as digital signals input from the color image information input unit 1 and for carrying out image processing such as masking, and a color printer apparatus 3 for reproducing color pictures by ejecting colored ink-drops of a plurality of colors of inks from nozzles toward a recording medium, for instance a plain piece of paper, to form color pictures thereon. Although a digital color scanner is, in this embodiment, employed as a color image information input unit 1, a device which can convert video signals from a color TV camera into digital signals to thus feed them to a color image information processing unit 2 can also be used.

The color image information input unit 1 scans a color original 11 wrapped around a rotary drum 10 in two dimensions to measure the color densities of the three primary colors, namely blue, green and red, included in each picture element. The rotary drum 10 can be driven by means of a pulse motor 12 to scan primarily (in the direction of the rotation of the drum) the color original 11, while the actual position of the rotary drum 10 undergoing rotation is, in the primary scanning direction, detected by a pulse counter 13 for counting driving pulses fed to the pulse motor 12. The counter 13 is adapted to reset the contents thereof each time the rotary drum 10 makes one revolution so that the actual position of the drum 10 undergoing rotation can be directly read from the pulse counter 13 during each one revolution thereof.

Light rays from light source 14 are condensed by means of a lens element 15 to illuminate a spot on the color original 11. Light rays striking a half-mirror 17 through a lens element 16 after reflection from the color original 11 are separated into two beams, i.e. transmitted light ways and reflected light rays. The latter pass through a blue light transmitting filter 18 to impinge upon a light receiving device 19 responding only to blue light, thus being photoelectrically transmuted.

The light rays transmitted by mirror 17 are further directed to another half-mirror 20 to be again separated thereby into two beams, i.e. transmitted light rays and reflected light rays. The latter transmitted light rays, after passing through a red light transmitting filter 23, will impinge upon a light receiving device 24 responding only to red light and the other reflected light rays after passing through a green light transmitting filter 21 will impinge upon a light receiving device 22 responding only to green light, whereby red and green are also photoelectrically transmuted. Consequently, color components in the proportion of the three primary colors included in the light rays reflected from each picture element, can be measured by light receiving devices 19, 22 and 24, respectively.

It is desirable to employ a blue color filter, a green color filter and a red color filter shown in the FIG. 1 having spectral characteristics of sensitivity equal or approximate to the CIE color matching function or its linear combinations. That is, although various colors of a color original are visually sensed as the same colors, it is possible that these colors are in fact multifarious as to their spectral characteristics. Thus it may be said that it is preferable to use a photometry system having a spectral characteristic which conforms to that of human eyes.

Figure 2:
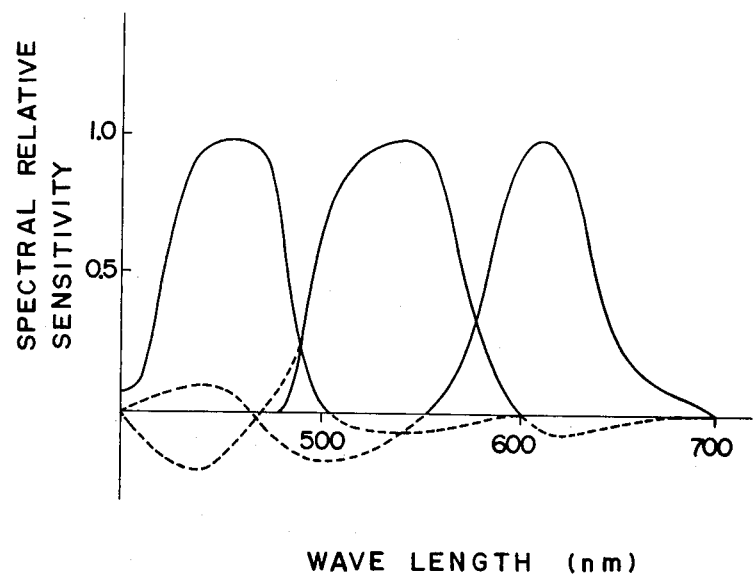
FIG. 2 is a graphical representation showing spectral characteristics of color filters using for color separation.

The spectral characteristic of sensitivity described above may be that which satisfies the Luther condition. In FIG. 2, solid curves represent spectral characteristics of sensitivity of color filters used in practice with the present invention and are approximative to the CIE color matching function in its characteristic. But the dotted curves illustrate the ideal spectral characteristics of sensitivity based on the color matching function.

All of light source 14, lens elements 15 and 16, half-mirrors 17 and 20, color filters 18, 21 and 23, and light receiving devices 19, 22 and 24 are firmly attached to a movable table 25 which is adapted to move parallel to the axis of the rotary drum 10 by means of a feed screw shaft 26 and a guide rod 27 in order thus to scan secondarily (in the direction perpendicular to the primary scanning direction) the color original 11. The feed screw shaft 26 is driven by means of a pulse motor 28 the total number of pulses fed to which being counted by another counter 29.

Color component signals of three primary colors generated by light receiving devices 19, 22 and 24 are logarithmically converted into signals of color density of converters 30 and then converted into digital signals by A-D (analog-to-digital) converters 31 which are provided one for each color. It is desirable to carry out, prior to said analog-to-digital conversions of color signals, image processing such as noise reduction and/or image enhancement as required. Although the light source 14 is, in this embodiment, disposed outside of the rotary drum 10 so that one can measure the reflected light from the color original 11, in the case of using color originals with a high transmittance such as color films, color component measurements can be made by a color scanner which is comprised of a transparent rotary drum with a light source inside and light receiving devices for receiving light rays passing through the transparent color original.

The color image processing unit 2 comprises an interface 33, a central processing unit (CPU) 34, a memory 35, line buffer memories 37 to 40, under color removal (UCR) circuits 41 to 44, dot pattern generates 45 to 48 and printing head drivers 49 to 52.

When reading color image information into the color image processing unit 2, the CPU 34 feeds driving pulses to the pulse motor 12 to rotate the rotary drum 10 in the primary scanning direction followed by the rotation of the pulse motor 28 through a fixed angle every one revolution of the rotary drum 10 so that the color original 11 is two-dimensionally scanned to measure quantities of three primary color components of each picture element on a scanning line. Color density signals of the three primary colors, namely blue, green and red, are converted into digital signals, to be read into the CPU 34 through the interface 33. The said color density signals of three primary colors are memorized as color image information in memory cells the locations of which are addressed by position signals from counters 13 and 29 corresponding to the position of each picture element.

A conventional mini-computer can be employed as the CPU described above for controlling the color image information input unit 1 and printer 3, for controlling the memorizing or reading out of the color image information, masking processing for color correction, character superimposition, and for carrying out the various image processings.

When reading or reading out color density signals of three primary colors, the masking procedures is carried out in the CPU 34 by the use of a polynominal function including non-linear terms in order thus to obtain a fine color reproducibility faithful to the original color 11 having complex color. The form of the non-linear masking should be selected having regard for the characteristics of photometry and inks, and desirably utilizing quadratic terms, logarithmic terms, exponential function terms and the like as non-linear terms.

The following matrix having variables which are, for example, color density signals of three primary colors, can be utilized in the non-linear masking:

$$\begin{pmatrix} Y_1 \\ Y_2 \\ Y_3 \end{pmatrix} = \begin{pmatrix} A_{11} A_{12} A_{13} A_{14} \ldots A_{1n} \\ A_{21} A_{22} A_{23} A_{24} \ldots A_{2n} \\ A_{31} A_{32} A_{33} A_{34} \ldots A_{3n} \end{pmatrix} \begin{pmatrix} X_1 \\ X_2 \\ X_3 \\ X_1^2 \\ X_2^2 \\ X_3^2 \\ X_1 X_2 \\ X_2 X_3 \\ X_3 X_1 \\ \cdot \\ \cdot \\ \cdot \\ K \end{pmatrix}$$

$X_1$: blue color density signal
$X_2$: green color density signal
$X_3$: red color density signal
$Y_1$: cyan color density signal
$Y_2$: magenta color density signal
$Y_3$: yellow color density signal
$A_{ij}$: coefficient
$K$: constant term -continued
(total number of terms: n)

The line-buffer memories 37 to 40 can memorize color image information for each picture element on four scanning lines which are sequentially read out from the memory 35. When simultaneously memorizing and reading out data, it is desirable to provide two line-buffer memories for every scanning line, and thus a total of eight line-buffer memories for four scanning lines.

Four UCR circuits 41 to 44 are provided corresponding one to each line-buffer memory whereby the masking color density signals of yellow, magenta and cyan of each picture elements are reduced somewhat and whereby the amount of black ink to be used is determined, thereby to provide the color density signals of yellow, magenta, cyan and black. A dot pattern generator 45 to 48 is provided for each UCR circuit, with its input terminal connected with the output terminal of the latter. Consequently the dot pattern generator 45 receives only the color density signals of yellow output from the UCR circuit 41, the dot pattern generator 46 receives only the color density signals of magenta output from the UCR circuit 42, the dot pattern generator 47 receives only the color density signals of cyan output from the UCR circuit 43 and the remaining one receives the density signals of black output from the UCR circuit 44. In each of the dot pattern generators 45 to 48, the locations and sizes of the ink dots to be depicted in a dot matrix, having n×m, for instance 3×3, possible positions for constructing an image element are determined in accordance with color density signals by referring to a predetermined table. Thus the dot pattern generator 45, when a series of yellow color density signals is fed thereto, converts these into three series of yellow color dot signals. In the case of a dot matrix of 4×4 possible positions for an image element, a dot pattern generator for producing four series of color dot signals can be employed.

Four printing head driving means 49 to 52, each of which includes three driving circuits, are provided corresponding to dot pattern generators 45 to 48, respectively. Printing head driving means 49 to 52, each of which includes three printing head driving circuits for each color and thus a total of 12 circuits for four colors, receive three series of dot signals from dot pattern generators 45 to 48, respectively. Each printing head driving circuit selects one of a plurality of voltage values, for instance, one of six voltage values into which the voltage difference between 80 to 250 volts is divided, in accordance with a dot signal to provide a printing head driving signal by modulating the voltage with a carrier signal of, for instance, 20 kHz frequency.

The ink-jet printer apparatus 3 ejects a series of ink drops from a head assembly onto a recording medium, for instance a white paper 55, wrapped around a rotary drum 54, to form a color image. The rotation of the rotary drum 54 is caused by a pulse motor 57 to which driving pulses are fed from the CPU 34. The pulses fed to the pulse motor 57 are counted by a pulse counter 58 which is adapted to reset to zero each time the rotary drum 54 makes one revolution so that the position of a head assembly 56 relative to the white paper 55 is indicated in the primary scanning direction, while signals of the information of positions in the primary scanning direction can be fed to the CPU 34.

As shown in FIG. 1, provided along and close to the outer surface of the rotary drum 54 is the head assembly 56 which is comprised of four groups of ink-jet heads 59 to 62 for yellow, magenta, cyan and black. Each group of ink-jet heads is comprised of three ink-jet heads of the conventional drop-on-demand type to which the particular printing fluid or ink is supplied from a reservoir (not shown).

Furthermore, if the color printing speed is to be slow, a single ink-jet head for each color may be used.

All the groups of ink-jet heads 59 and 62 are simultaneously driven to form three dot lines on the recording paper 55, so that a single color picture element is formed in the form of a dot matrix consisting of three dot lines on each of which three ink dots may be distributed. A picture element with half-tone can be formed in about 30 to 70 steps of gradation depending on the variation of sizes and arrangement of ink dots to be distributed in a single dot matrix having three possible positions in both the row and the column. A picture element having complex colors can be formed in such a way as to arrange ink dots of four kinds of colors having various sizes in a matrix; and this is an arranging color mixture (mean value color mixture) similar in its effects to the additive color mixture or the subtractive color mixture technique.

A plurality of groups of ink-jet heads 59 to 62 are arranged in the secondary scanning direction with separation from each other a distance comprising the width of several tens of scanning lines therebetween; hence ink drops can be prevented from being turbid and flowing since the colored ink drops previously deposited on a recording paper 55, after they soak in, are laid by the other color ink drops. Furthermore, because it suffices to mount to plurality of groups of ink-jet heads 59 to 62 on a straight support member 63, the head assembly can be constructed with simplicity, whilst the adjustment of the distance between the head assembly and the rotary drum can be performed easily compared with conventional head assemblies arranged in the direction of the circumference of a rotary drum. The distances between each two adjacent groups of ink-jet heads can be adjusted to differ from each other depending on the characteristics of the inks and recording papers used. They can as well be adjusted to be equal distances. Consequently it is possible to make the distance between groups of ink-jet heads 59 and 60 larger than that between groups of ink-jet heads 61 and 62 in order to prevent more completely ink drops from becoming turbid and flowing.

The head assembly 56 is attached to a movable supporting member 66 which can be moved in a direction parallel to the axis of the rotary drum 54 by means of a feed screw shaft 64 and a guide rod 65. The feed screw shaft 64 is adapted to be rotated by a pulse motor 67 which is caused to rotate by the output of driving pulse signals from the CPU 34. A counter 68 counts the driving pulses fed to the pulse motor 67 to indicate the number of driving pulse signals. Here, since a plurality of groups of ink-jet heads are arranged with separation in the secondary scanning direction, it is necessary for each group of ink-jet heads to detect its positions. For this, each group of ink-jet heads 59 to 62 is provided with a scanning counter 69 to 72, respectively, which begins to count driving pulses subsequently to a resetting thereof to the value initially set in accordance with the position of the group of ink-jet heads relative to the rotary drum 54.

When printing a color image, the CPU 34 generates driving pulse signals to drive the pulse motors 57 to 67 in such a way as to move the head assembly 56 in the secondary scanning direction by a regular distance equal to a scanning pitch every time the rotary drum 54 makes one revolution. As the positions of ink-jet heads 59 to 62 are detected by counters 69 to 72, respectively, color density signals of three primary colors of picture elements on four scanning lines are sequentially read out according to the respective line from the memory by addressing the lines depending on said positions detected when groups of ink-jet heads 59 to 62 should simultaneously eject ink drops toward a recording paper. Said color density signals of three primary colors are masked by non-linear equation to generate color density signals of the primaries, namely, yellow, magenta and cyan, the signals being written sequentially in an extremely short time into line buffer memories 37 to 40 provided for the respective groups of ink-jet heads 59 to 62. Furthermore, the color density signals of the primaries memorized in the line buffer memories 37 to 40 are converted into four color density signals of yellow, magenta, cyan and black by means of the UCR circuits 41 to 44 and thus fed to the dot pattern generators 45 to 48 for four colors in each of which a single series of color density signals fed thereto is converted into three series of dot signals. A series of dot signals is read out depending on the position signals from the counter 58 in order to position the head assembly 56 relative to the rotary drum 55.

The three series of dot signals are fed to head driving means 49 and 52 and then are converted into analog head driving voltage. This head driving voltage causes the group of ink-jet heads to eject ink drops toward the recording paper 55 running in the primary scanning direction, thus painting three rows of ink dots. The same procedure described above is replicated for the other colors. Therefore four lines of different color, namely cyan, magenta, yellow and black, each line of which is constructed from three rows of the same color ink dots, are simultaneously painted. As a result, a dot matrix of three possible positions on the row and column constructing one picture element is filled with four different colors of ink dots by the motion of the head assembly 56 in the secondary scanning direction by steps of one scanning pitch equal to three times a dot's size, so as to compose the complex colors.

Details of the structure and color printed ink dot patterns of the above color image information processing apparatus 2 and color printer 3 are disclosed in copending U.S. patent application Ser. No. 346,908 filed Feb. 8, 1982, the disclosure of which is incorporated herein by reference.

The image processed by the color image information processing unit 2 will be confirmed by the use of a television monitor and furthermore can be reformed following observation of the image displayed so as to reproduce a desirable image. Furthermore by memorizing processed image information signals into the memory 35, a plurality of identical images can be reproduced.

According to the present invention, an improved color reproducibility can be obtained by the use of combinations of inks of yellow, magenta and cyan dyes to be described below as well as by the use of non-linear masking techniques described previously.

Examples of yellow ink are aqueous inks comprising a yellow dye of the formula [I]

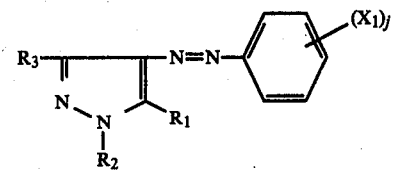

wherein $R_1$ is amino or acylamino (e.g. acetylamino), $R_2$ is phenyl, phenyl substituted by chlorine, alkoxy, alkyl, sulfo or carboxyl, $C_{1-4}$ lower alkyl or lower alkyl substituted by sulfo or carboxyl, $R_3$ is $C_{1-4}$ lower alkyl or phenyl, $X_1$ is halogen (e.g. chlorine), $C_{1-4}$ lower alkyl, $C_{1-4}$ alkoxy, sulfo, carboxyl, amino, substituted amino (e.g. acetylamino), cyano, $C_{1-4}$ alkylsulfonyl, nitro, hydroxyl, ureido or alkoxycarbonyl, j is 0, 1, 2 or 3, provided that when j is 2 or 3, $X_1$ can be the same or different, and the number of sulfo groups is 1–3.

Examples of magenta ink are in aqueous ink comprising magenta dye of the formula [II-a], [II-b] or [II-c]:

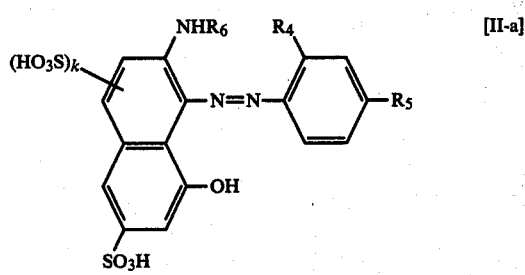

wherein $R_4$ is cyano, $C_{1-4}$ alkylsulfonyl, arylsulfonyl (e.g. phenylsulfonyl, p-chlorophenylsulfonyl or p-chlorophenylsulfonyl), trifluoromethyl, trichloromethyl or halogen (e.g. chlorine or bromine), $R_5$ is amino, acylamino (e.g. acetylamino), substituted ureido (e.g. with alkyl, $C_{1-4}$ alkoxy, or acyloxy), $R_6$ is hydrogen, $C_{1-4}$ lower alkyl, phenyl or ceyl (e.g. acetyl or benzoyl), and k is 0 or 1.

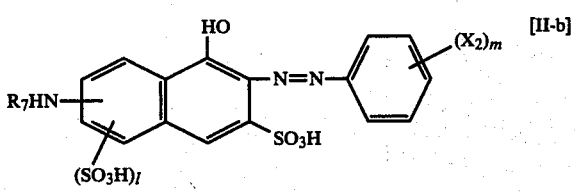

wherein $R_7$ is hydrogen, acyl (e.g. acetyl or benzoyl), $C_{1-4}$ lower alkyl or phenyl, $X_2$ is halogen (e.g. chlorine or bromine), $C_{1-4}$ lower alkyl, $C_{1-4}$ alkoxy, sulfo, carboxyl, amino, substituted amino (e.g. acetylamino), cyano, $C_{1-4}$ alkylsulfonyl, nitro, hydroxyl, ureido or $C_{2-5}$ alkoxycarbonyl, l is 0 or 1, and m is 0, 1, 2 or 3, provided that when m is 2 or 3, $X_2$ can be the same or different.

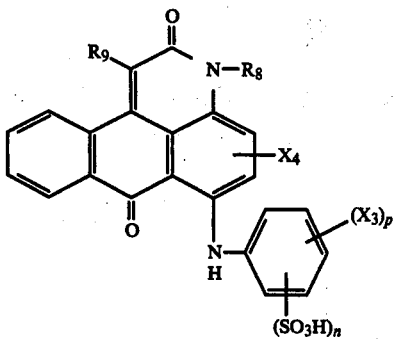

[II-c]

wherein $R_8$ is hydrogen, $C_{1-4}$ lower alkyl or phenyl, $R_9$ is hydroxy, $C_{1-4}$ lower alkyl, phenyl, $C_{2-5}$ alkoxycarbonyl, carboxyl or cyano, $X_3$ is $C_{1-4}$ lower alkyl, halogen (e.g. chlorine or bromine), $C_{1-4}$ alkoxy, carboxyl, cyano, hydroxyl or nitro, $X_4$ is hydrogen or $C_{1-4}$ lower alkyl, n is 1, 2 or 3, and p is 0, 1, 2, 3 or 4 provided than when p is 3 or 4, $X_3$ can be the same or different.

An example of such a cyan ink is an aqueous ink comprising a cyan dye of the formula [III]

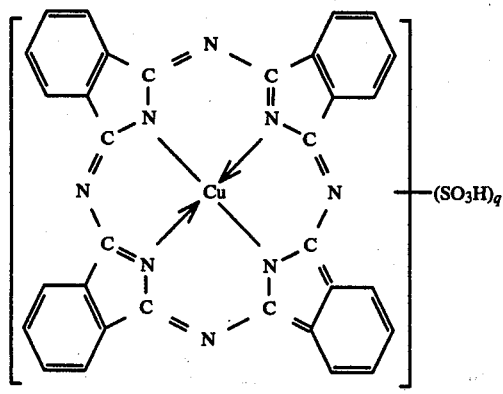

[III]

wherein q is 1 to 4.

In the compounds of formulae [I], [II-a], [II-b], [II-c] and [III], the sulfo group can be an alkali metal salt such as a sodium or potassium salt, an ammonium salt or an organic amine salt such as triethylamine, pyridine or triethanolamine salt.

The preferred groups in the compounds of formula [I] are amino for $R_1$, phenyl or phenyl substituted by sulfo or chlorine, or sulfoalkyl, most preferably phenyl or phenyl substituted with chlorine or sulfo for $R_2$, methyl or phenyl for $R_3$, and chlorine, $C_{1-3}$ lower alkyl (e.g. methyl or ethyl) or sulfo for $X_1$. The number of sulfo groups in the compound of formula [I] is preferably 1 or 2.

The preferred groups in the compounds of formula [II-a] are cyano, $C_{1-2}$ alkylsulfonyl or halogen (e.g. chlorine or bromine) for $R_4$, amino or acylamino (e.g. acetylamino), and hydrogen or acyl (e.g. acetyl) for $R_6$. k is preferably 0.

Preferred groups in the compounds of formula [II-b] are hydrogen or acyl (e.g. acetyl or benzoyl) for $R_7$, and $C_{1-4}$ alkoxy (e.g. methoxy or ethoxy), or halogen (e.g. chlorine or bromine) for $X_2$. l is preferably 1.

The preferred groups in the compounds of formula [II-c] are hydrogen or $C_{1-3}$ lower alkyl (e.g. methyl or ethyl) for $R_8$, hydrogen or $C_{2-4}$ alkoxycarbonyl (e.g. methoxycarbonyl or ethyoxycarbonyl) for $R_9$, $C_{1-4}$ lower alkyl (e.g. methyl or ethyl), or halogen (e.g. chlorine) for $X_3$, and hydrogen or methyl for $X_4$. n is preferably 1 or 2.

In the compounds of formula [III], q is preferably 2 to 4.

Embodiments of yellow, magenta and cyan dyes in the aqueous inks of the present invention are illustrated as follows, but are not to be construed as limiting the invention.

Yellow dye:

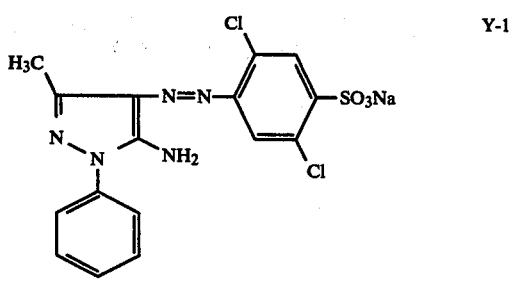

Y-1

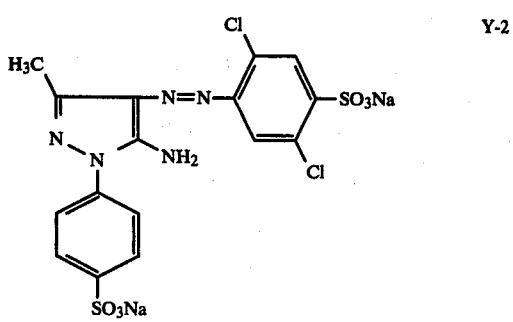

Y-2

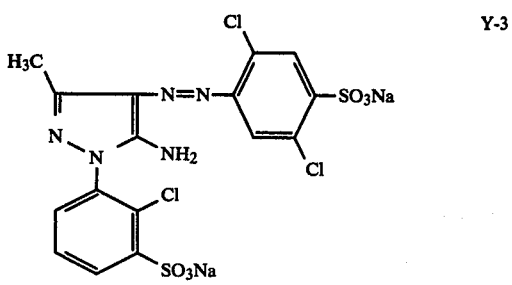

Y-3

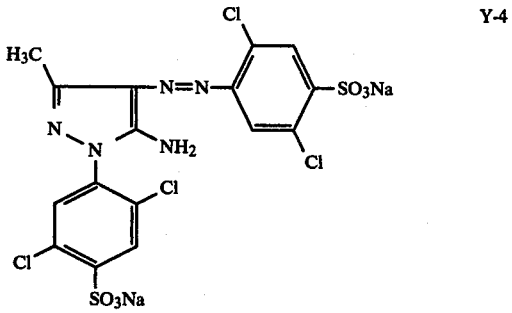

Y-4

-continued
Y-5
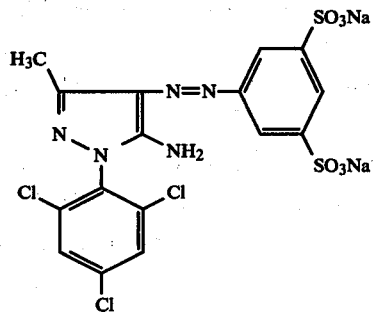
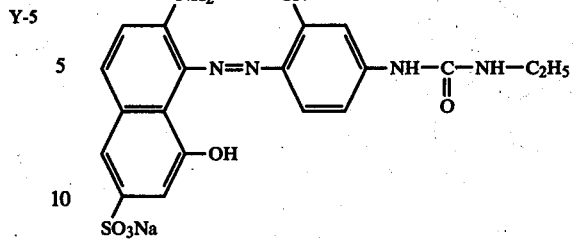  M-2
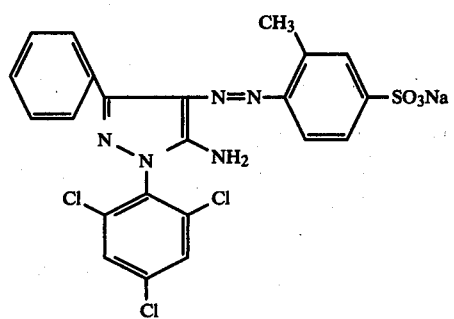  Y-6
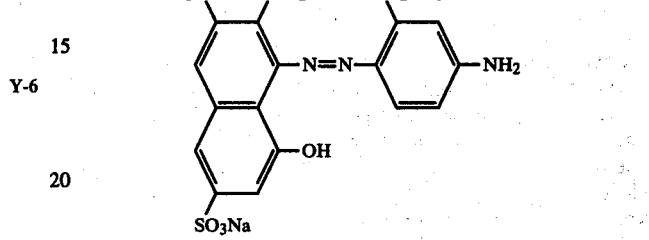  M-3
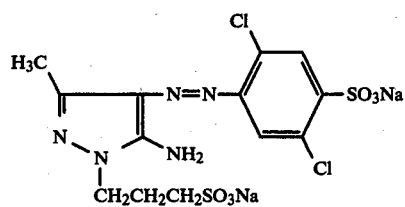  Y-7
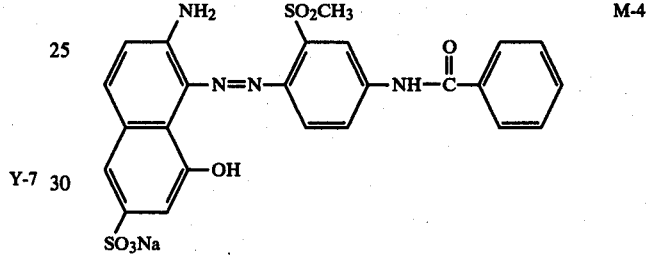  M-4
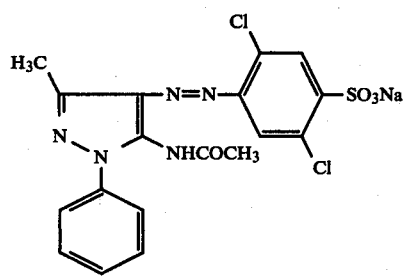  Y-8
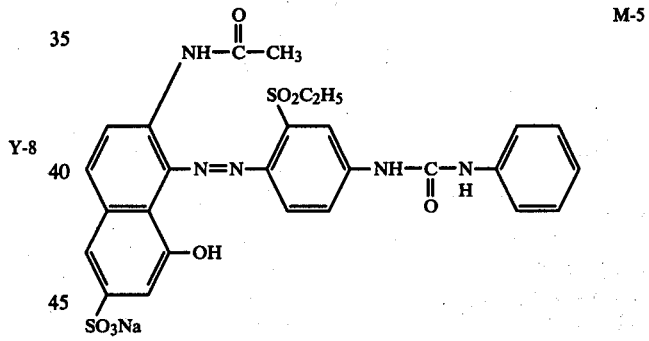  M-5
Magenta dye:
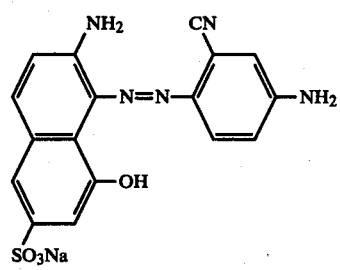  M-1
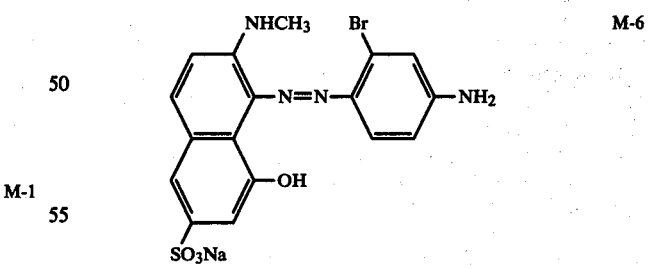  M-6
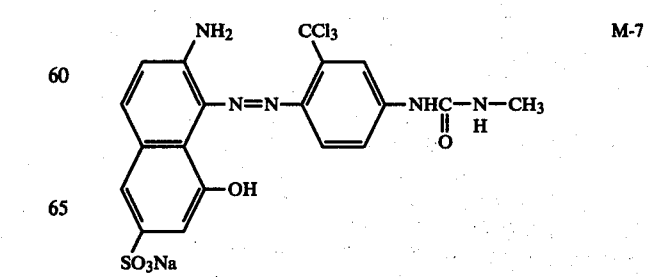  M-7

-continued

M-8 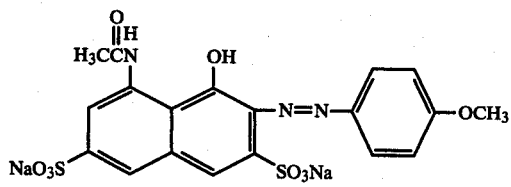

M-9 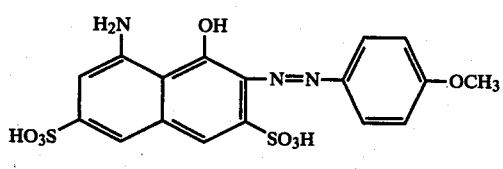

M-10 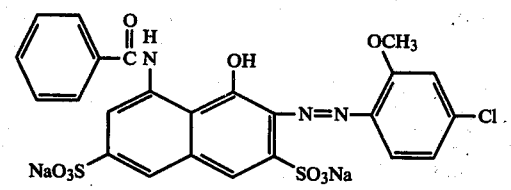

M-11 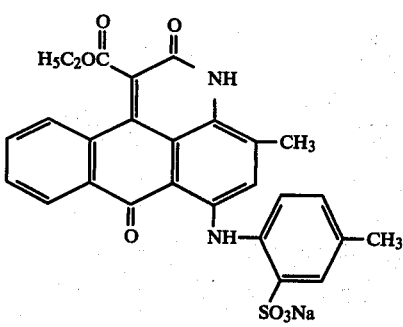

M-12 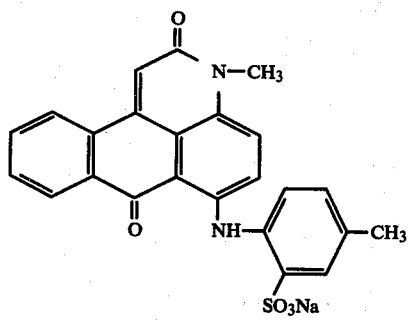

M-13 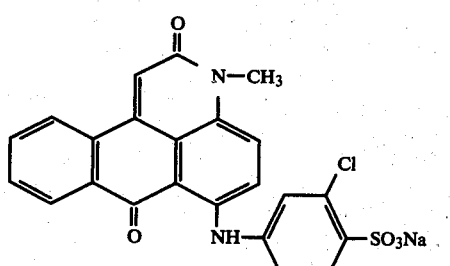

-continued

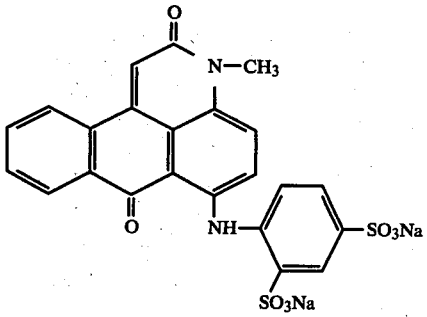

Cyan dye:

C-1 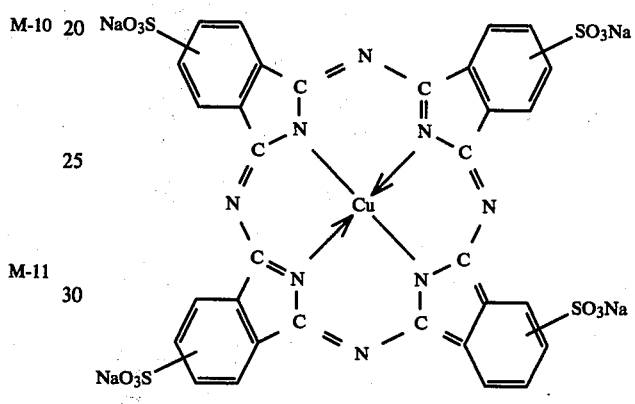

C-2 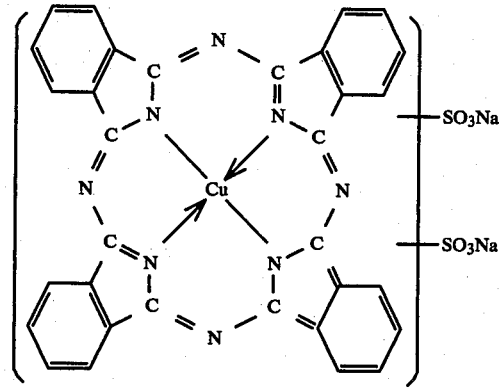

The ratio of water-soluble dyes in the aqueous ink used in the present invention is usually 0.5–4 parts by weight per 100 parts by weight of ink. If the content is less than 0.5%, the coloring agent is ineffective. Use of more than 4% results in the precipitation of the dye from the ink in the course of time even though the dye is in solution, and is not suitable for jet-printing inks.

Wetting agents are preferably added to the aqueous ink of the present invention for improving the dryness-resistance of the ink and to aid in dissolving the dye. The preferred wetting agents are non-volatile at normal temperature, have more than 30 dyne/cm of surface tension, and preferably more than 45 dyne/cm at normal temperature, and a viscosity of less than 5 cps in 3–40% solution. Furthermore it is preferred to use more than 1% of the water soluble dye described hereinbefore.

Preferred examples of wetting agents are 2-pyrrolidones (Jap. Pat. Unexamined Publ. Nos. 50-71423, 51-5127 and 51-137505), carboxylic acidamide derivatives (ibid. Nos. 49-97620, 51-8031 and 51-8033), lactones (ibid. No. 55-48207), 2,2'-thiodiethanol (ibid. No. 51-5129), alcohol amines (ibid. No. 51-52004), N-formyl lactam derivatives (ibid. No. 51-31525), polyalkyleneglycols and polyalkyleneglycol monoesthers (Jap. Pat. Examined Publ. No. 51-40484), Jap. Pat. Unexamined Publ. Nos. 51-1375 and 54-12909), primary alcohols such as t-butylalcohol and n-amylalcohol (Jap. Pat. Unexam. Publ. No. 51-129310), cellulose derivatives such as hydroxypropyl cellulose and polyvinyl alcohol (ibid. No. 50-17840), polyoxyethylene sorbitan fatty acid esters, polyoxyethylene fatty acid esters, polyoxyethylene alkylphenyl ethers (ibid. No. 50-143602) and water soluble alginic acid salts, and 1,3-dialkyl-2-imidazolidinones such as N,N'-dimethyl-1,3-imidazolidinone-(2) (ibid. No. 54-62005).

The amount of wetting agent used in the present invention can be varied according to its nature, and is preferably 0.2–30 parts by weight per 100 parts by weight of ink.

The aqueous ink used in the present invention can contain more than two kinds of wetting agents as described hereinabove.

Black dye can be used together with the yellow, magenta and cyan dyes of the formulae [I], [II] and [III], respectively.

Preferred black dyes are direct dyes or acid dyes disclosed in Jap. Pat. Unexamined Publ. Nos. 50-15622, 50-17840, 50-49004, 51-5127, 51-5128, 51-52004, 51-137506, 53-61412 and 53-77706, and Jap. Pat. Examined Publ. No. 54-16243.

Fungicides and oxygen absorption agents can be added to the ink used in the present invention.

Preferred fungicides are sodium dehydro acetate (Jap. Pat. Unexamined Publ. No. 52-12008), benzisothiazolin-3-one, (ibid. No. 52-12009), 6-acetoxy-2,4-dimethyl-m-dioxane (ibid. No. 52-12010), formalin and sodium pentachlorophenyl (ibid. No. 50-15622), and sodium benzoate (ibid. No. 53-135707).

Preferred oxygen absorption agents are sulfites such as sodium sulfite or sodium bisulfite (Jap. Pat. Unexam. Publ. Nos. 52-74406 and 53-61412).

Anionic surface active agents such as sodium alkyl sulfate esters, cationic surface active agents such as alkylpyridinium sulfates and nonionic surface active agents such as polyoxyethylene alkyl ethers or amphoteric surface active agents can be added to the aqueous ink of the present invention as a surface tension modifier.

In the ink-jet color printing system of the present invention, any recording medium commonly used in the conventional ink-jet recording systems using aqueous ink can be used. A typical recording medium is paper. Commercially available high-quality paper, continuous strip paper, art paper or coated paper can be used for recording. Preferred papers are low-density manufactured papers without added sizing agent, ink-jet recording papers of good absorbancy and non-blurring papers (Jap. Pat. Unexam. Publ. Nos. 52-53012, 52-74340 and 53-49113) or specifically treated ink-jet recording papers (ibid. Nos. 55-144172 and 55-146786). Also cloth, plastic-film-coated surfaces with an ink-absorbing agent, wood plates or metal plates can be used.

The present invention is explained in more detail with reference to the following example:

EXAMPLE (1) Yellow ink:

| | Parts by weight: |
|---|---|
| Dye (Y-1) | 2.8 |
| Diethyleneglycol | 1.0 |
| 2,2'-Thiodiethanol | 16.0 |
| Nonionic surface active agent | 0.2 |

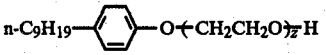

($z$: about 9)

| | |
|---|---|
| Water | 80.0 |

The above mixture was stirred at 40°–50° C. for one hour, and press-filtered through a microfilter Type FM (0.8$\mu$, 47 $\phi$, Fuji Photo Film Co.) to prepare yellow ink.

(2) Magenta ink:

| | |
|---|---|
| Dye (M-8) | 1.2 |
| Diethyleneglycol monoethyl ether | 0.5 |
| N—methyl-2-pyrrolidone | 15.0 |
| Nonionic surface active agent | 0.3 |

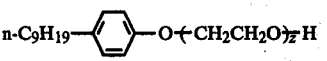

($z$: about 9)

| | |
|---|---|
| Water | 83.0 |

The above mixture was treated in the same way as hereinabove to prepare magenta ink.

(3) Cyan ink:

| | |
|---|---|
| Dye (C-1) | 2.4 |
| Diethyleneglycol monobutyl ether | 0.5 |
| N—methyl-2-pyrrolidone | 10.0 |
| N—hydroxyethyl lactamide | 5.0 |
| Nonionic surface active agent | 0.1 |

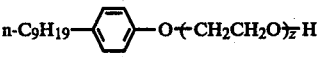

($z$: about 9)

| | |
|---|---|
| Water | 82.0 |

The above mixture was treated in the same way as hereinabove to prepare cyan ink.

(4) Recording paper:

100 parts by weight of LBKP were beaten in CSF (430 cc). Talc 5 parts, saponified rosin 1 part and band sulfate 2 parts were added thereto, and paper of the weight 152 g/m$^2$ was produced on a paper machine. Oxidized starch was spread (2 g/m$^2$) on the paper by a size-press.

A spreading solution containing 12.3% solid matter, comprising synthetic zeolite 100 parts, gelatin 100 parts, hydroxyethyl cellulose 38.5 parts, hardening agent 10 parts and surface active agent 0.12 part was spread at the rate of 6.6 g/m$^2$ on the surface of the above paper by a bar coating method and dried. The surface was smoothed with a super calender.

(5) Ink-jet color printing apparatus:

Color image information input unit: drum scanner;

Characteristic of color filters used for color separation on color image information input unit: shown in FIG. 2;

Memory device: magnetic disc (capacity 40 MB);

Detecting means for position of the head: pulse counter;

Image information processing unit: PANAFACOM U-1500 minicomputer;

Ink-jet ejecting heads: drop-on-demand type head;

Head driving frequency: 20 KHz.

(6) Masking equation:

In the matrix hereinbefore, a masking equation of 10 terms comprising primary, quadratic and constant terms, was used for color correction.

The following coefficients $A_{ij}$ were used:

| | | | | | |
|---|---|---|---|---|---|
| $A_{11}$ | 0.062500 | $A_{21}$ | 0.031250 | $A_{31}$ | 0.968750 |
| $A_{12}$ | −0.046875 | $A_{22}$ | 0.859375 | $A_{32}$ | −0.375000 |
| $A_{13}$ | 0.953125 | $A_{23}$ | −0.109375 | $A_{33}$ | 0.140625 |
| $A_{14}$ | 0.031250 | $A_{24}$ | 0.203125 | $A_{34}$ | 0.906250 |
| $A_{15}$ | 0.281250 | $A_{25}$ | 0.281250 | $A_{35}$ | −0.125000 |
| $A_{16}$ | 0.109375 | $A_{26}$ | −0.109375 | $A_{36}$ | −0.05625 |
| $A_{17}$ | −0.093750 | $A_{27}$ | −0.218750 | $A_{37}$ | 0.812500 |
| $A_{18}$ | −0.187500 | $A_{28}$ | 1.171875 | $A_{38}$ | −0.843750 |
| $A_{19}$ | 0.531250 | $A_{29}$ | −0.265625 | $A_{39}$ | −0.031250 |
| $A_{110}$ | 0.093750 | $A_{210}$ | 0.203125 | $A_{310}$ | 0.093750 |

The above values are standardized within the range of values from −2 to +2, and the terms $A_{110}$, $A_{210}$ and $A_{310}$ are constants.

Figure 3:
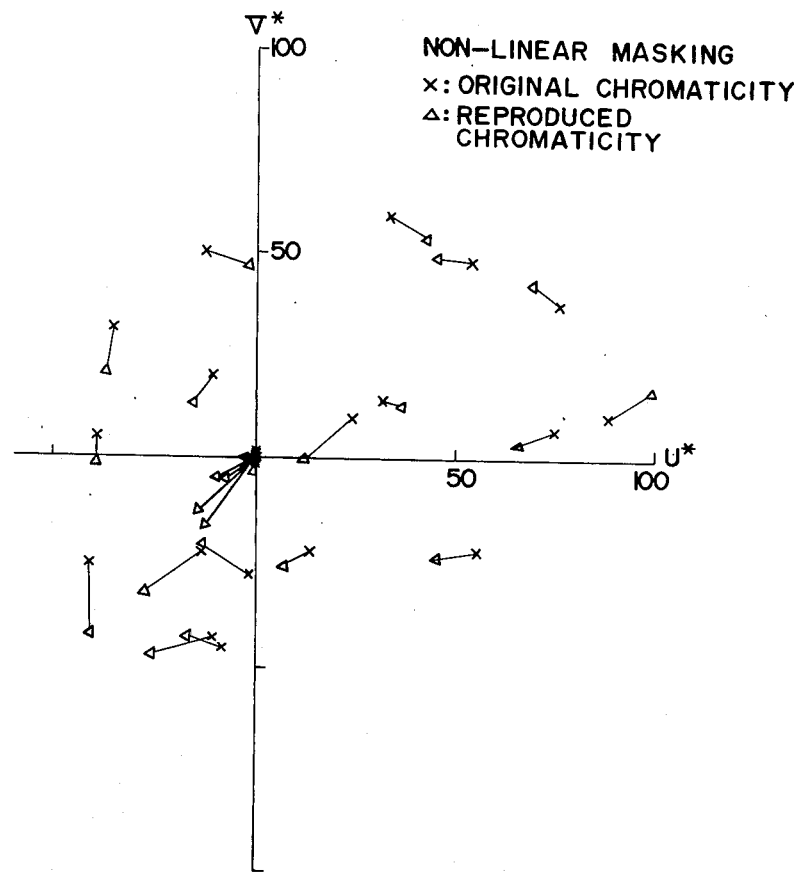
FIG. 3 is a graphical representation showing characteristics of color reproduction with the use of non-linear masking.

In the above combination, the ink-jet print reproduction image was produced with a color paper printed from a negative obtained by photographing the 24-color Macbeth Color Chart, as an original, to obtain the color reproduction characteristics shown in FIG. 3. In that figure, chromaticity is shown by the CIE (1964) (U*V*W*) color representation system.

Figure 4:
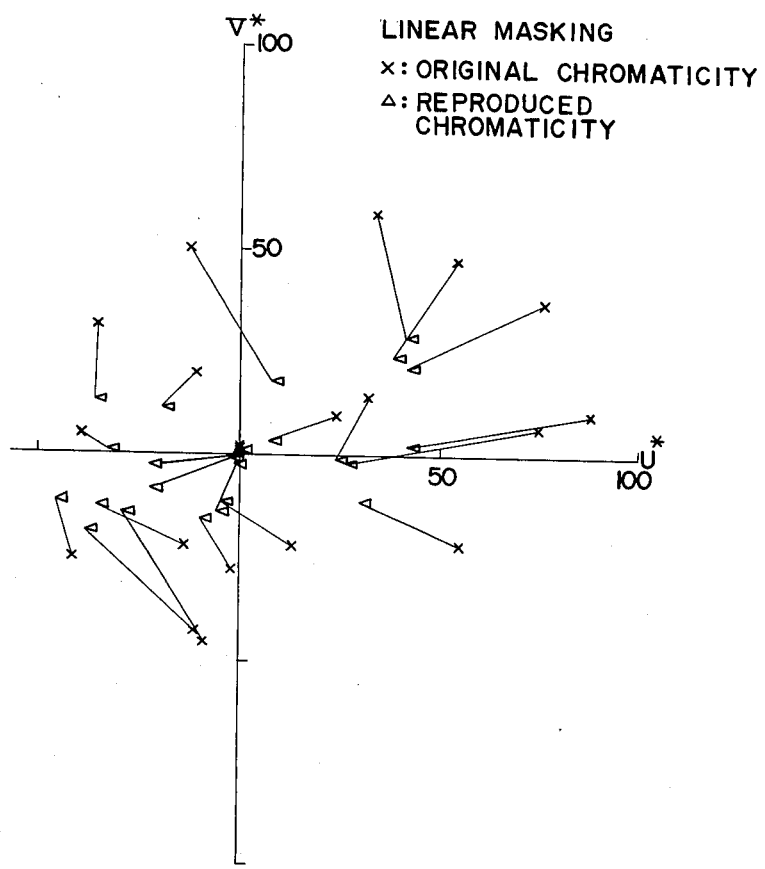
FIG. 4 is a graphical representation showing characteristics of color reproduction with the use of linear masking.

The present invention was compared with known ink-jet printing reproduction images prepared by ink-jet color printing systems. The color reproduction characteristics shown in FIG. 4 were obtained in the case of linear masking. But the improved color reproduction characteristics of the present invention were confirmed by comparison of FIGS. 3 and 4.

(1') Yellow ink:

| | |
|---|---|
| Dye-1 (control) (refer to Jap. Pat. Unexam. Publ. No. 54-89811) | 1.4 parts by weight |

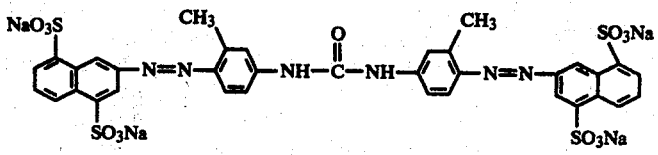

| | |
|---|---|
| Diethyleneglycol | 1.6 |
| 2,2'-Thiodiethanol | 10.0 |
| N—methyl-2-pyrrolidone | 6.0 |
| Nonionic surface active agent | 0.2 |

(z: about 9)

n-C$_9$H$_{19}$—⟨phenyl⟩—O(CH$_2$CH$_2$O)$_z$H

| | |
|---|---|
| Water | 80.0 |

Yellow ink as a control was prepared by the same preparation procedure as mentioned hereinbefore.

(2') Magenta ink:

| | |
|---|---|
| Dye-2 (control) (refer to Jap. Pat. Unexam. Publ. No. 54-89811) | 1.8 parts by weight |

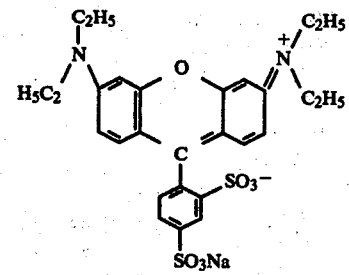

| | |
|---|---|
| Diethylene glycol | 1.0 |
| 2,2'-Thiodiethanol | 10.0 |
| N—methyl-2-pyrrolidone | 6.0 |
| Nonionic surface active agent | 0.2 |

(z: about 9)

n-C$_9$H$_{19}$—⟨phenyl⟩—O(CH$_2$CH$_2$O)$_z$H

| | |
|---|---|
| Water | 80.0 |

Magenta ink as a control was prepared by the same procedure as mentioned hereinabove.

(3') Cyan ink:

| | |
|---|---|
| Dye-3 (control) (refer to Jap. Pat. Unexam. Publ. No. 54-89811) | 2.0 parts by weight |

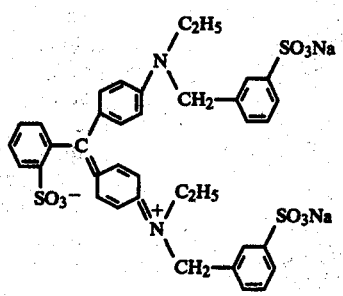

| | |
|---|---|
| Diethylene glycol monobutyl ether | 0.5 |
| N—methyl-2-pyrrolidone | 10.0 |
| N—hydroxyethyl lactamide | 5.0 |
| Nonionic surface active agent | 0.1 |

-continued (3') Cyan ink:

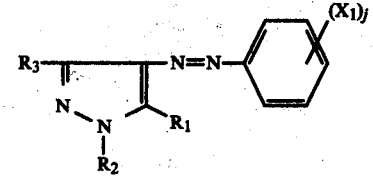

| | (z: about 9) |
|---|---|
| Water | 82.0 |

Cyan ink as a control was prepared by the same preparation procedure as described hereinabove.

(4') Recording paper:

The same recording paper as mentioned in item (4) hereinbefore.

(5') Color ink-jet printing apparatus:

The same color ink-jet printing apparatus as mentioned in item (5) hereinbefore.

(6') Masking equation:

In the matrix formula given hereinbefore, the cubic term masking equation consisting of a primary term, wherein the coefficient $A_{ij}$ was used for color correction as follows:

| $A_{11}$ | 0.062500 | $A_{21}$ | 0.031250 | $A_{31}$ | 0.968750 |
| $A_{12}$ | −0.046875 | $A_{22}$ | 0.859375 | $A_{32}$ | −0.375000 |
| $A_{13}$ | 0.953125 | $A_{23}$ | −0.109375 | $A_{33}$ | 0.140625 | in which the values thereof are standardized within the range from −2 to +2.

In the preferred embodiments of the invention, a scanning apparatus is comprised of a rotary drum movable in the primary scanning direction and a scanning head assembly intermittently movable in the secondary scanning direction; however, in the case of color originals such as hard sheets like metal, it may be so modified as a planar scanning device or a TV camera device.

As many apparently widely different embodiments of this invention may be made without departing from the spirit and scope thereof, it is to be understood that the invention is not limited to the specific embodiments thereof except as defined in the appended claims.

What is claimed is:

1. An ink-jet color printing method for forming a color picture in the form of dot patterns with ink dots of a plurality of colors on a recording medium, comprising the following steps:

(1) utilizing ink-jet color printing apparatus comprising:

color image information input means for receiving color image information of picture elements in the form of digital signals;

memory means for memorizing the said digital signals of the color image information;

image processing means for masking said digital signals of the color image information;

head assembly means closely adjacent said recording medium, including at least a group of ink-jet heads for ejecting yellow ink drops, a group of ink-jet heads for ejecting magenta ink drops and a group of ink-jet heads for ejecting cyan ink drops;

two-dimension scanning means for scanning the surface of said recording medium by a continuous motion of said head assembly relative to said recording medium and an intermittent motion of said head assembly relative to said recording medium in the direction perpendicular to that of said continuous motion;

detecting means for detecting positions of said head assembly relative to said recording medium in the direction of said continuous motion to generate first signals;

a plurality of detecting means for detecting positions of said groups of ink-jet heads, respectively, in the direction of said intermittent motion to generate second signals;

information read-out means for reading the color image information from said memory means corresponding to said second signals; and means for each group of ink-jet heads to convert color density signals of a single color of ink drops to be ejected by said ink-jet heads extracted from said color image information into analog signals and to feed said analog signals to said ink-jet heads corresponding to said first signals in order to drive them;

(2) utilizing a masking technique comprising carrying out a non-linear masking procedure;

(3) utilizing aqueous ink comprising yellow dye of the formula [I] hereinbelow supplied into the said yellow ink-jet head;

(4) utilizing aqueous ink comprising magenta dye of the formulae [II-a], [II-b] or [II-c] hereinbelow supplied into the said magenta ink-jet head; and (5) utilizing aqueous ink comprising cyan dye of the formula [III] hereinbelow supplied into the said cyan ink-jet head;

[I] yellow dye:

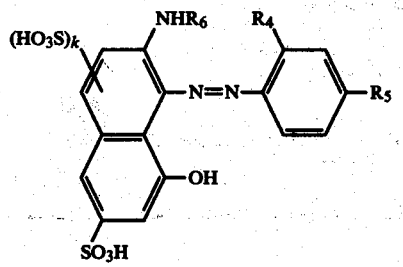

wherein $R_1$ is amino or acylamino, $R_2$ is phenyl, substituted phenyl, lower alkyl or substituted lower alkyl, $R_3$ is lower alkyl or phenyl, $X_1$ is halogen, lower alkyl, alkoxy, sulfo, carboxyl, amino, substituted amino, cyano, alkylsulfonyl, nitro, hydroxy, ureido or alkoxycarbonyl, j is 0, 1, 2 or 3, provided that when j is 2 or 3, $X_1$ can be the same or different and the number of sulfo groups is 1–3;

[II-a] magenta dye:

wherein $R_4$ is cyano, alkylsulfonyl, arylsulfonyl, trifluoromethyl, trichloromethyl, or halogen, $R_5$ is amino, acylamino, substituted ureido, alkoxy or acyloxy, $R_6$ is hydrogen, lower alkyl, phenyl or acyl, and k is 0 or 1;

[II-b] magenta dye:

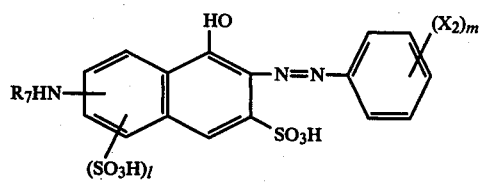

wherein $R_7$ is hydrogen, acyl, lower alkyl or phenyl, $X_2$ is halogen, lower alkyl, alkoxy, sulfo, carboxyl, amino, substituted amino, cyano, alkylsulfonyl, nitro, hydroxy, ureido or alkoxycarbonyl, l is 0 or 1, m is 0, 1, 2 or 3, and when m is 2 or 3, $X_2$ may be the same or different;

[II-c] magenta dye:

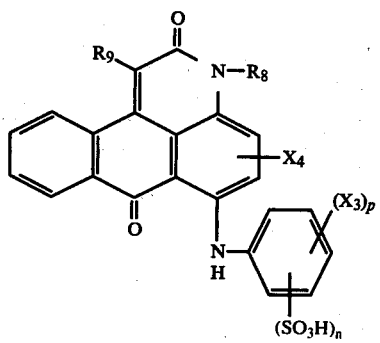

wherein $R_8$ is hydrogen, lower alkyl or phenyl, $R_9$ is hydrogen, lower alkyl, phenyl, alkoxycarbonyl, carboxyl or cyano, $X_3$ is lower alkyl, halogen, alkoxy, carboxyl, cyano, hydroxy or nitro, $X_4$ is hydrogen or lower alkyl, n is 1, 2 or 3, p is 0, 1, 2, 3 or 4, provided that when p is more than 2, $X_3$ may be the same or different.

[III] cyan dye:

-continued
[III] cyan dye:

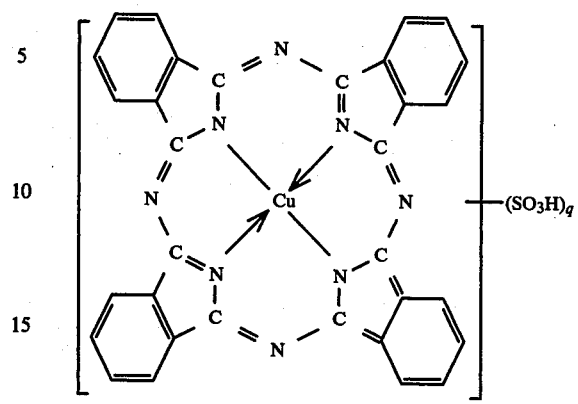

wherein q is 1 to 4, and the metal salts, ammonium salts and organic amine salts of the sulfone groups in formulae [I], [II-a], [II-b], [II-c] and [III].

2. An ink-jet color printing method as defined in claim 1, wherein the said non-linear masking procedure is computed by the use of a polynominal including non-linear terms.

3. An ink-jet color printing system as defined in claim 2, wherein the said polynominal includes 10 terms which are primary terms, quadratic terms and constants.

4. An ink-jet color printing method as defined in claim 2, wherein said image processing is applied to said signals of the color image information read-out from said memory means.

5. An ink-jet color printing method as defined in claim 2, wherein said color image information input is effected by color separation measurement for measuring density signals of blue, green and red of picture elements by two-dimensionally scanning said color originals and converting said density signals into digital signals.

6. An ink-jet color printing method as defined in claim 5, wherein said color separation measurement is effected by color separation filters having spectral characteristics approximate to the CIE color matching function.

7. An ink-jet color printing method as defined in claim 5, wherein said scanning means includes a rotary drum supporting said recording medium to rotate in a direction of main scanning, and a mobile table to move intermittently in a direction perpendicular to that of the rotation of said rotary drum.

8. An ink-jet color printing method as defined in claim 7, wherein said ink-jet heads are arranged along a direction parallel to the axis of said rotary drum.

9. An ink-jet color printing method as defined in claim 8, and utilizing ink-jet heads which are of the drop-on-demand type.

10. An ink-jet color printing method as defined in claim 9, and utilizing a group of ink-jet heads for ejecting black ink drops and generating color density signals for the black ink according to the color density signals of three primaries.

* * * * *